(No Model.)
W. R. PATTERSON.
METHOD OF REPAIRING TELEGRAPH CABLES.
No. 311,522. Patented Feb. 3, 1885.
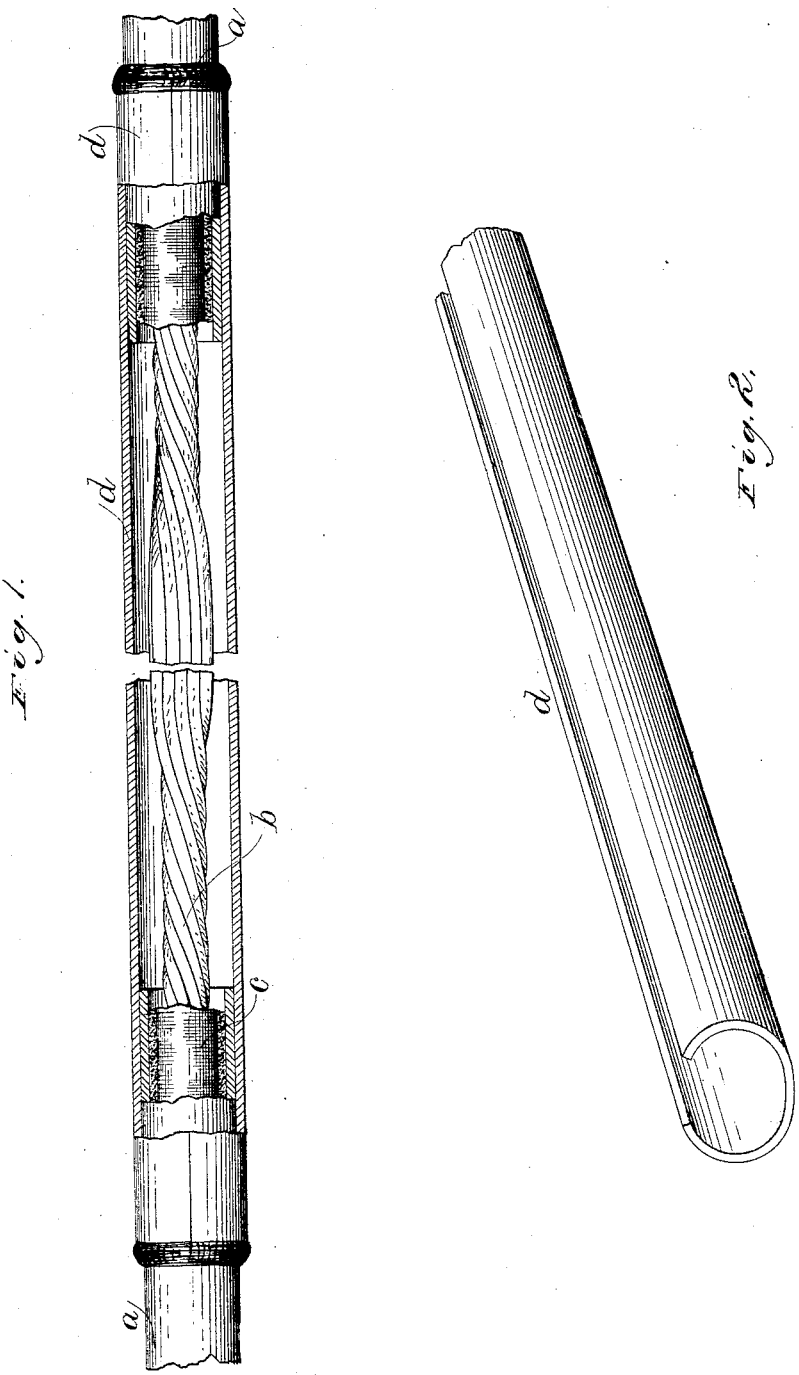
Witnesses.
Henry Frankfurter
Saml B. Dover.
Inventor.
William R. Patterson
By George H. Barton
Attorney.

UNITED STATES PATENT OFFICE.

WILLIAM R. PATTERSON, OF CHICAGO, ILLINOIS, ASSIGNOR TO THE WESTERN ELECTRIC COMPANY, OF SAME PLACE.

METHOD OF REPAIRING TELEGRAPH-CABLES.

SPECIFICATION forming part of Letters Patent No. 311,522, dated February 3, 1885.

Application filed September 22, 1884. (No model.)

*To all whom it may concern:*

Be it known that I, WILLIAM RODNEY PATTERSON, a citizen of the United States, residing at Chicago, in the county of Cook and State of Illinois, have invented a certain new and useful Improvement in Methods of Repairing Telegraph-Cables, (Case 42,) of which the following is a full, clear, concise, and exact description, reference being had to the accompanying drawings, forming a part of this specification.

My invention relates to repairing telegraph-cables; and it consists in removing the lead pipe from the portion of the cable that has been damaged by moisture and pouring onto the conductors of the core hot paraffine until the moisture is evaporated, and then inclosing the conductors, thus dried, with a sleeve of lead, as herein described and claimed. Heretofore it has been common to cut out the damaged portion of the cable and splice in a new piece, thus necessitating the renumbering of the wires at each end of the cable and interrupting the working of all the uninjured wires during all the time occupied in making the repairs.

My invention is illustrated in the accompanying drawings, in which Figure 1 is a view, partially in section, of a portion of a cable that has been repaired by my method. Fig. 2 is a perspective view of the sleeve which is designed to be placed about the cable to protect the conductors that have been dried.

The location of the fault may be determined in any well-known way. The lead pipe $a$ is then removed until the portion of the core $b$ that has become moist is uncovered. The serving $c$, which binds the different insulated conductors of the core together, is then removed, so as to allow the conductors to separate to a certain extent. I now pour on hot paraffine—paraffine oil or other hot liquid insulating material—until the conductors are dried. The insulating material should be above the boiling temperature of water. A sleeve of lead, $d$, slit longitudinally, and large enough to fit about the pipe of the cable, is then placed about the core. The seam is then closed up, and the joints soldered, so as to form over the repaired portion of the core a water-proof covering of lead. In case the insulation has been burned off from any of the conductors by the escaping current the damage should be repaired before the sleeve is put in place.

I claim—

1. The method of repairing telegraph-cables which consists in removing the lead pipe from the injured portion, pouring onto the conductors hot paraffine or other insulating material until the moisture is evaporated, and then protecting the core by a sleeve of lead soldered at each end to the lead pipe and made water-tight, as described.

2. The method of repairing electric cables which consists in exposing and separating the insulated conductors where they have become moist, pouring thereon hot paraffine, and protecting the conductors thus dried by placing a lead sleeve about the lead pipe of the cable and soldering it thereto at each end and along the longitudinal seam, substantially as and for the purpose specified.

In witness whereof I hereunto subscribe my name this 11th day of September, A. D, 1884.

WILLIAM R. PATTERSON.

Witnesses:
  GEORGE P. BARTON,
  H. ODELL.